United States Patent [19]

Bane, III

[11] Patent Number: 5,441,170
[45] Date of Patent: Aug. 15, 1995

[54] SHIPPING CONTAINER WITH MULTIPLE INSULATED COMPARTMENTS

[76] Inventor: William W. Bane, III, 1608 N. Franklin St., Wilmington, Del. 19806

[21] Appl. No.: 197,785

[22] Filed: Feb. 16, 1994

[51] Int. Cl.⁶ .......................... B65D 5/49; B65D 5/56
[52] U.S. Cl. .................................... 220/462; 206/523; 220/410; 229/120.37
[58] Field of Search .............. 220/403, 408, 410, 462, 220/902; 206/523, 584, 594; 229/120.37, 120.38

[56] References Cited

U.S. PATENT DOCUMENTS

| | | | |
|---|---|---|---|
| 547,833 | 10/1895 | Asan et al. | 229/120.37 |
| 1,882,524 | 10/1932 | Sherman | 229/120.37 |
| 2,006,822 | 7/1935 | Andrews | 229/120.38 |
| 2,010,812 | 8/1935 | Devine . | |
| 2,015,283 | 9/1935 | Pashley et al. | 229/120.37 |
| 2,070,905 | 2/1937 | Justheim . | |
| 2,247,341 | 6/1941 | Anderson | 229/120.37 |
| 2,488,194 | 11/1949 | Hunsworth | 220/410 |
| 2,523,145 | 9/1950 | Robinson . | |
| 2,807,402 | 9/1957 | Nelbach | 220/410 |
| 2,817,123 | 12/1957 | Jacobs . | |
| 2,939,811 | 6/1960 | Dillon . | |
| 2,988,129 | 8/1961 | Bekins | 206/523 |
| 2,998,337 | 8/1961 | Tillotson . | |
| 3,160,307 | 12/1964 | Morrison . | |
| 3,264,165 | 8/1966 | Stickel . | |
| 3,344,973 | 10/1967 | Studen . | |
| 3,412,521 | 11/1968 | Baunan | 206/523 |
| 3,481,455 | 12/1969 | Graham et al. | 206/523 |
| 3,516,596 | 6/1970 | Madden et al. | 220/410 |
| 3,591,768 | 7/1971 | Torres . | |
| 3,640,832 | 2/1972 | Kurz . | |
| 3,681,092 | 8/1972 | Titchenal et al. . | |
| 3,802,591 | 4/1974 | Mizushima et al. . | |
| 3,856,178 | 12/1974 | Norgaard . | |
| 3,887,068 | 6/1975 | Ghione . | |
| 3,890,762 | 6/1975 | Ernst et al. . | |
| 4,078,701 | 3/1978 | Clubb . | |
| 4,269,323 | 5/1981 | Ito et al. . | |
| 4,502,295 | 3/1985 | Toledo-Pereyra . | |
| 4,642,970 | 2/1987 | Bane . | |
| 4,730,748 | 3/1988 | Bane . | |
| 4,928,847 | 5/1990 | Hollander et al. | 220/408 |
| 4,953,705 | 9/1990 | Evany | 206/523 |
| 5,160,025 | 11/1992 | Greenawald | 206/523 |
| 5,323,911 | 6/1994 | Johnston et al. | 220/410 |

FOREIGN PATENT DOCUMENTS

| | | | |
|---|---|---|---|
| 1173827 | 3/1959 | France | 229/120.38 |
| 856558 | 12/1960 | United Kingdom | 206/523 |
| 2173174 | 10/1986 | United Kingdom | 206/523 |

*Primary Examiner*—Gary E. Elkins
*Attorney, Agent, or Firm*—Shlesinger Arkwright & Garvey

[57] ABSTRACT

A reusable container for shipping multiple uniquely temperature sensitive materials, which includes an outer container having a plurality of interconnected side walls with a sealable top and a closed bottom. A plurality of inner containers, each including a plurality of insulated side panels, are provided. The side panels each include first and second members where each of the first panel members have generally planar first and second longitudinal surfaces. The first panel members are positioned so that first longitudinal surfaces thereof substantially engage one another and the second panel members are positioned adjacent respective side walls of the outer container. The first panel members may have substantially equal thickness or may have a minimum combined thickness substantially equal to one and a half times the thickness of one of the first panel members.

20 Claims, 5 Drawing Sheets

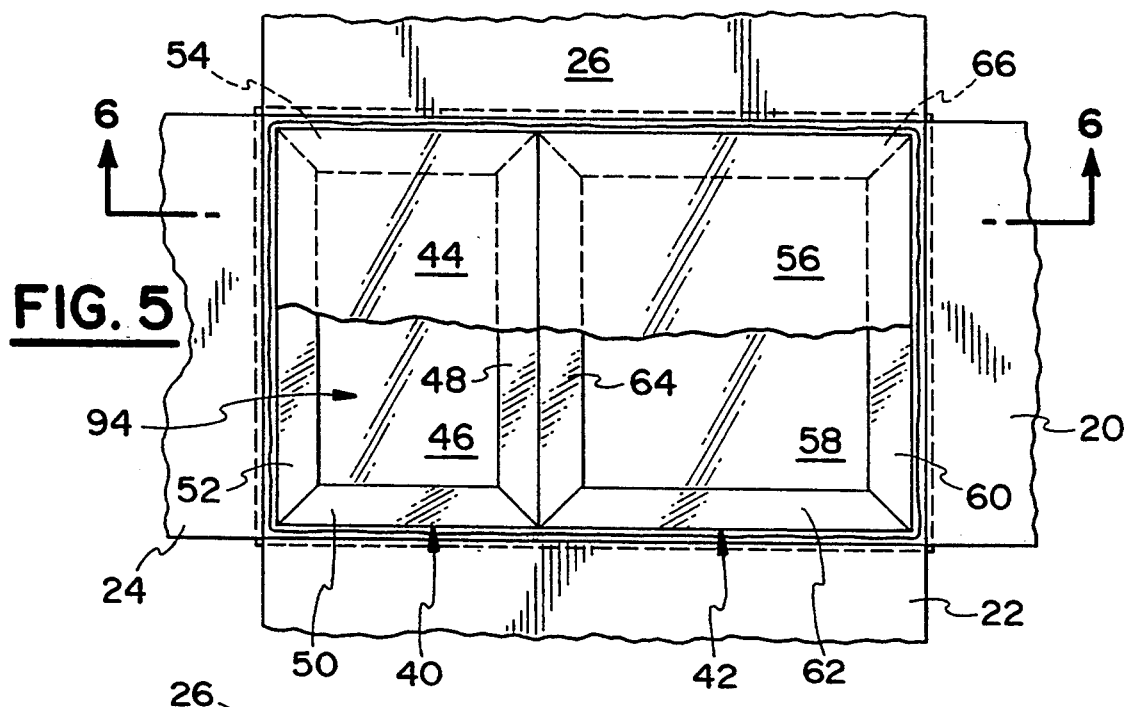
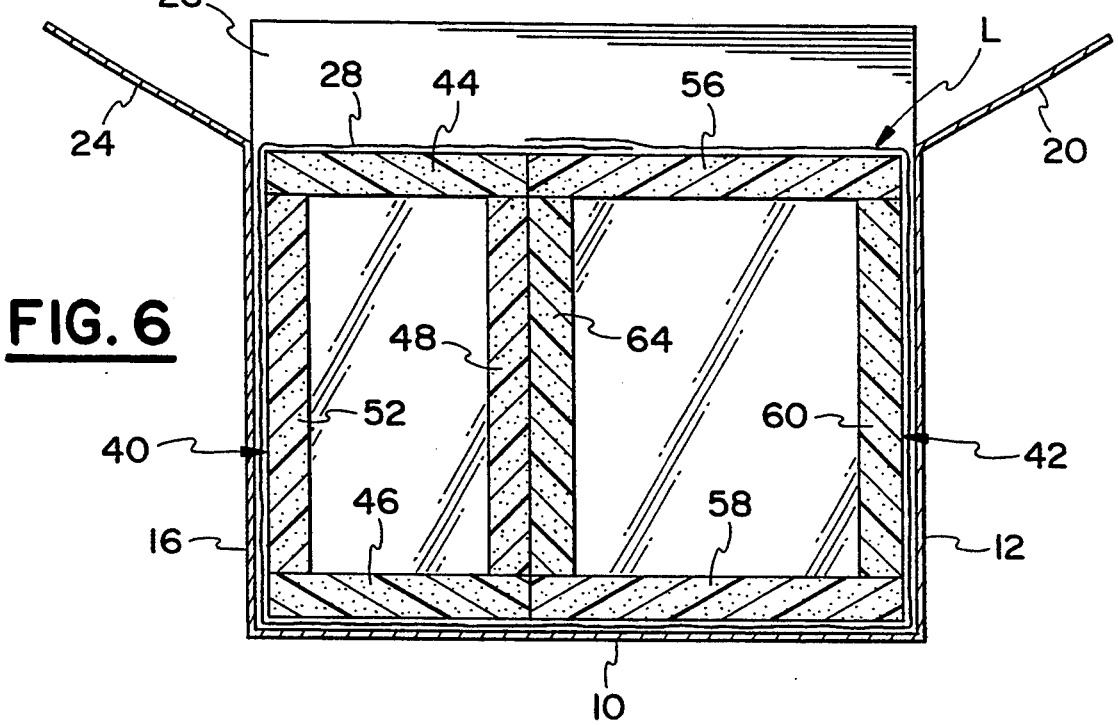

SHIPPING CONTAINER WITH MULTIPLE INSULATED COMPARTMENTS

FIELD AND HISTORICAL BACKGROUND OF THE INVENTION

The present invention is directed to an insulated shipping container, and more particularly to a shipping container with multiple insulated inner compartments.

The shipment of multiple temperature sensitive objects in one container, where each object is required to be maintained at a different critical temperature, is frequently required in the course of medical and scientific research. The quantity of material which must be shipped may be of such small size that delivery by express or courier service is feasible and cost effective so long as each object can be maintained at its own critical temperature. Conventional insulated shipping containers are not, unfortunately, adequate for thermally isolating each object. Furthermore, the quantity of material being shipped is so slight that conventional temperature control systems are unfeasible.

Medical and scientific research may require that multiple objects which are sensitive to temperature fluctuations be transmitted simultaneously between two distant locations taking up to 100 hours or more for shipping time. This is a typical situation in such diverse areas as organ transplants and biotechnology. Shipment of these objects may require that each object be maintained at a different temperature throughout the shipping period or else each object may suffer severe damage.

The materials being shipped must also be protected from violent impacts and rough handling. Consequently, the container in which the material is shipped must have substantial structural integrity. Additionally, the container in which the material is shipped must be capable of withstanding point impacts of substantial force.

Various insulated shipping containers have been proposed in the art, and some examples of which are disclosed in U.S. Pat. Nos. 3,856,178; 3,890,762; and 4,730,748. However, these containers suffer from many disadvantages and there is a need in the art for an insulated shipping container with reusable multiple thermally isolated compartments which can be easily assembled and disassembled, and which can easily be easily manufactured for custom sizes.

OBJECTS AND SUMMARY OF THE INVENTION

The primary object of the disclosed invention is to provide a reusable insulated shipping container which is adapted for transporting multiple uniquely temperature sensitive objects in one overall container, over extended time periods, without the need for elaborate temperature control systems.

A further object of the disclosed invention is to provide a shipping container which isolates each object transported, such that the temperature of each object remains virtually unaffected by the temperature of the other objects being transported.

Another object of the disclosed invention is to provide a shipping container which includes removable multiple insulated inner containers formed from a plurality of rigid foam panels.

Yet another object of the disclosed invention is to provide a shipping container which includes a removable spill containment device, such as liner, which prevents leakage of liquids and provides additional protective padding.

An additional object of the disclosed invention is to provide a shipping container which is greatly versatile in offering the flexibility of shipping a non-temperature sensitive object together with a temperature sensitive object, without affecting the quality of each other.

Another object of the disclosed invention is to provide a shipping container which helps keep shipping costs to a minimum by using sturdy, lightweight insulated panels.

In summary, the present invention provides a reusable insulated shipping container which is adapted for transporting multiple uniquely temperature sensitive objects in one overall container, such that the temperature of each object remains virtually unaffected by the temperature of the other objects being transported.

BRIEF DESCRIPTION OF THE DRAWINGS

The above and other objects and advantages and novel features of the present invention will become apparent from the following detailed description of the preferred embodiment of the invention illustrated in the accompanying drawings, wherein:

FIG. 5 is a top plan view of the shipping container of FIG. 1, with a portion broken away to show the interior of the inner insulated containers;

FIG. 6 is a vertical, cross-sectional view of the shipping container taken along line 6—6 of FIG. 5;

FIG. 7 is an enlarged, fragmentary cross-sectional view of an insulated side panel taken along line 7—7 of FIG. 4;

DETAILED DESCRIPTION OF THE INVENTION

Figure 1:
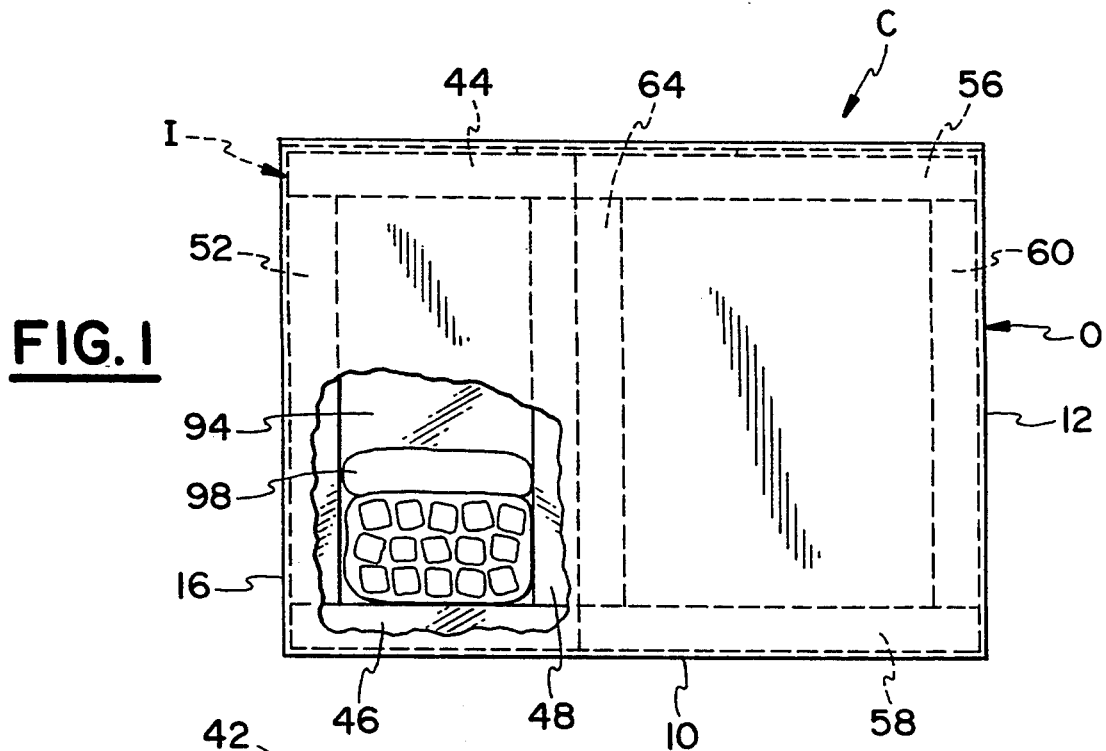
FIG. 1 is a side elevational view of the shipping container of the invention shown with a portion broken away for disclosing one of the inner insulated containers partially filled with ice and a material which is being shipped.
Figure 2:
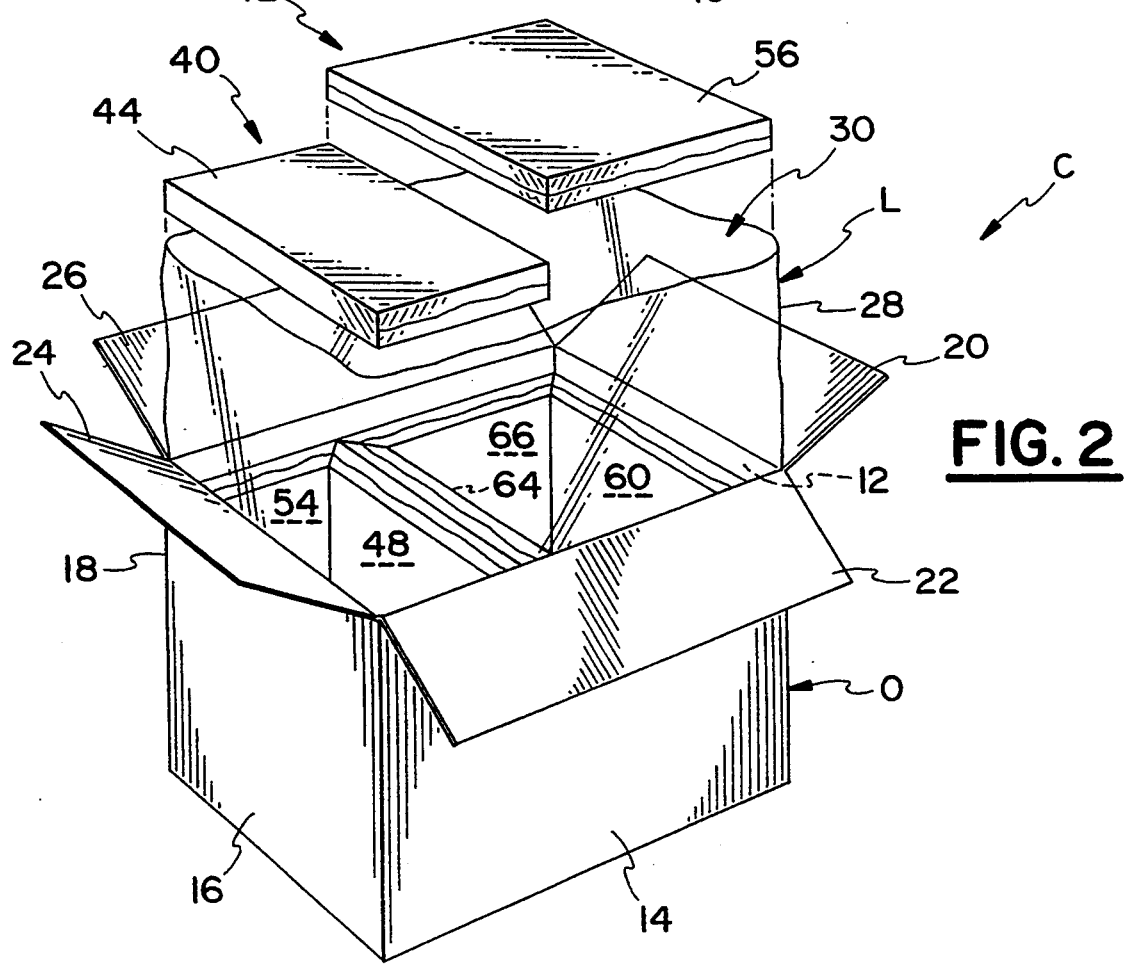
FIG. 2 is a perspective view, partially exploded, of the shipping container of FIG. 1.
Figures 3, 4:
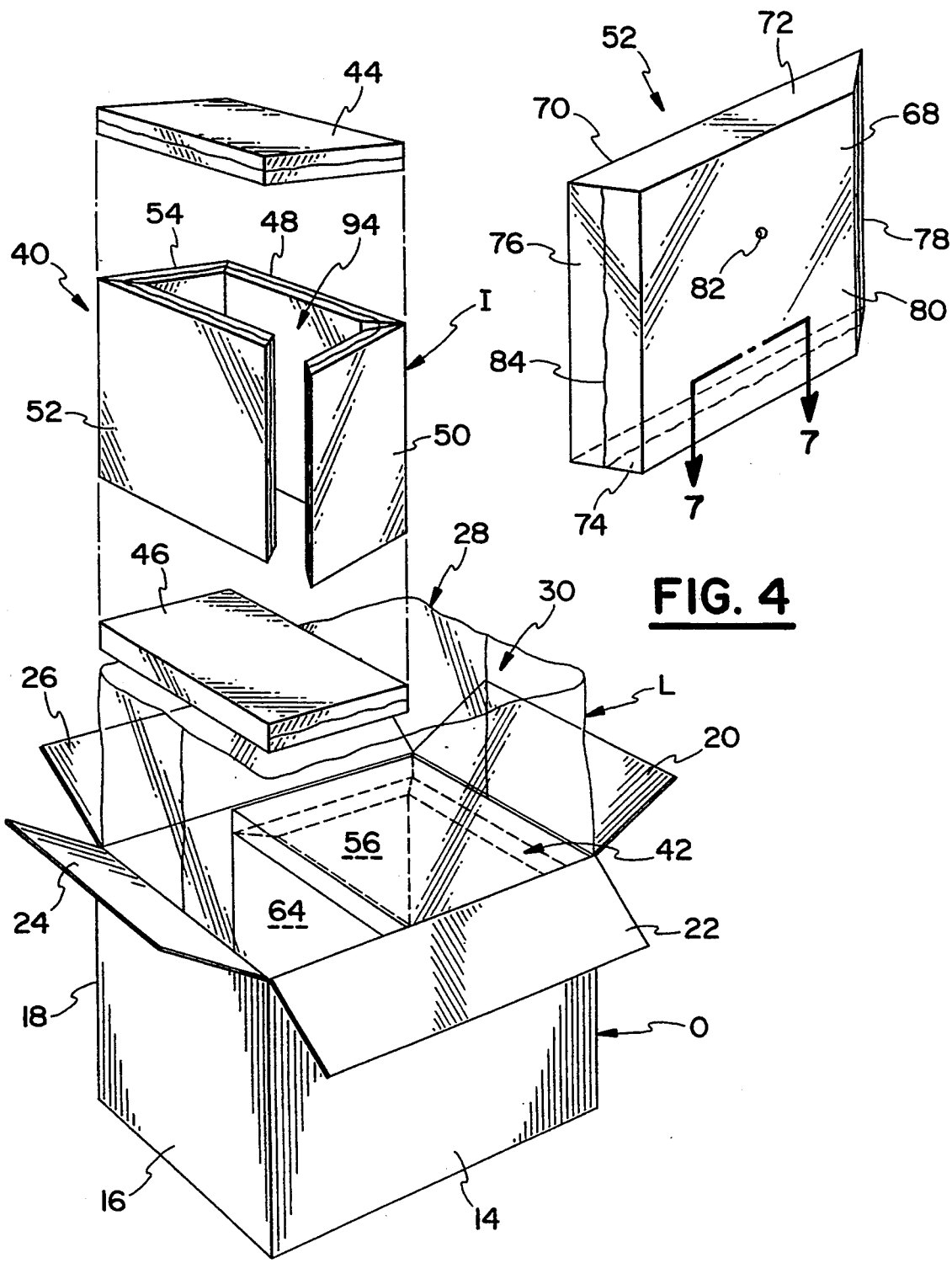
FIG. 3 is a perspective view of the shipping container of FIG. 1, shown with an exploded perspective view of one of the inner insulated containers.
FIG. 4 is a perspective elevational view of an insulated side panel of one of the inner insulated containers.

As best shown in FIGS. 1, 2, and 3, the shipping container C comprises three main components, an outer container O, a spill containment device L (FIG. 2) and inner container I.

The outer container O, which is in the form of a conventional corrugated shipping container, has a closed bottom 10 and interconnected sidewalls 12, 14, 16, 18 therewith (FIG. 2), and sealable top flaps 20, 22, 24, 26 hingedly connected to sidewalls 12, 14, 16, 18, respectively. Top flaps 20, 22, 24 26 are folded inwardly such that flaps 22 and 26 cover flaps 20 and 24 (FIG. 1).

Conventional fasteners, such as staples, tape or other means may be used for sealing top flaps 22 and 26 together to close the outer container O.

Figure 9:
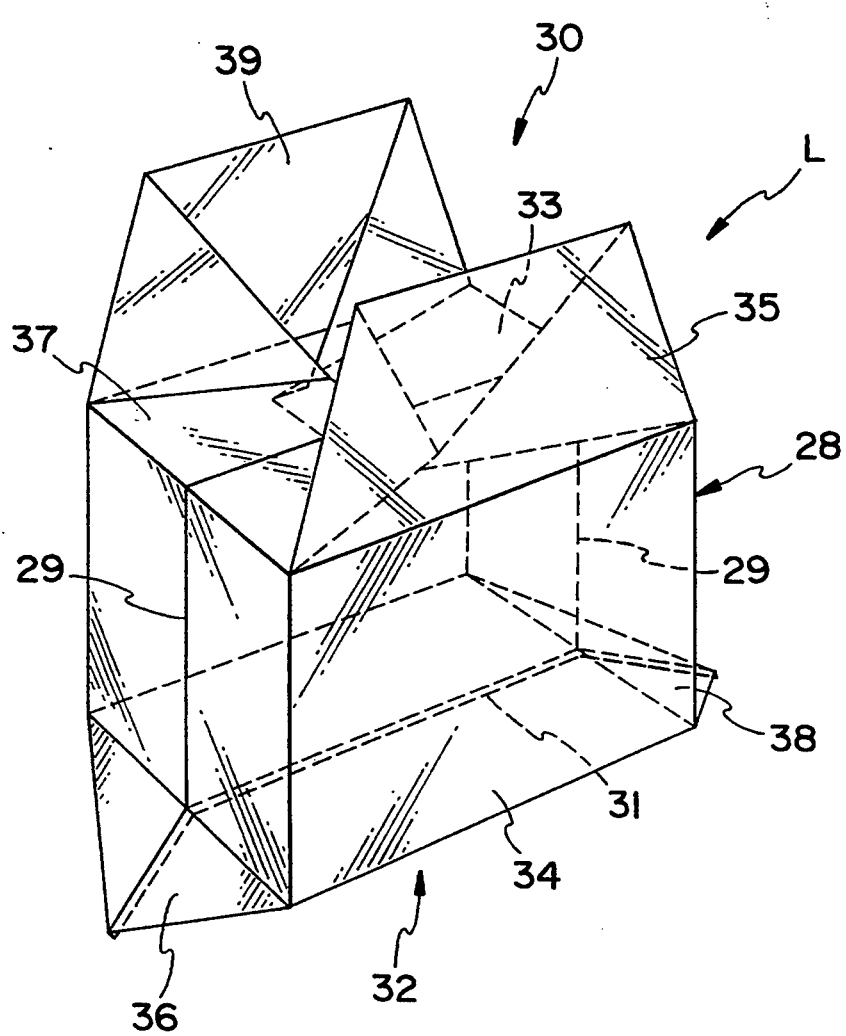
FIG. 9 is a perspective view of the liner partially folded, shown without the inner and outer containers for clarity.
Figure 10:
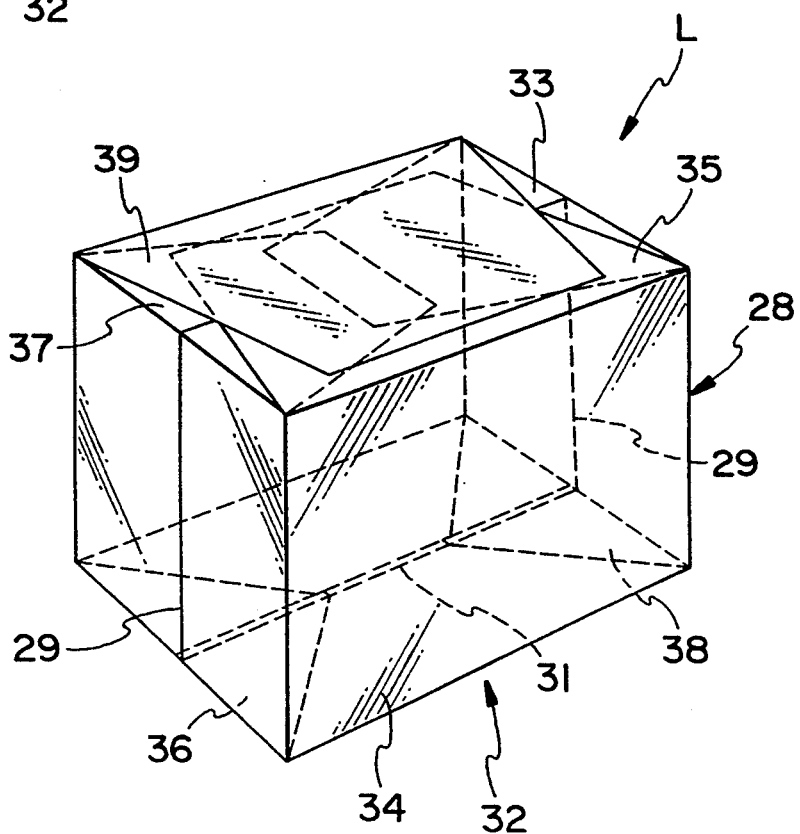
FIG. 10 is a perspective view of the liner of FIG. 9 shown completely folded.

As best shown in FIGS. 2 and 9, the spill containment device L which is generally in the form of a cylindrical plastic liner 28 has an open top 30 and a bottom 32, which is closed at seam 31. The liner 28 is placed into outer container O and one of ordinary skill in the art would appreciate that due to the flexible nature, liner 28 would assume the shape of container 0 upon its placement therein (FIG. 10). The length of liner 28 extends beyond the height of side walls 12, 14, 16, 18 (FIG. 2). As shown in FIGS. 9 and 10, the bottom 32 of liner 28 includes a flat portion 34 which generally conforms to the bottom 10 of the outer container O, and two end flap portions 36 and 38 which are folded between the flat portion 34 and the bottom 10 of the outer container O. The folded flap portions 36 and 38 function as cushions between the outer container O and the inner container I. The top 30 of the plastic liner 28 can be closed by inwardly folding top panels 33, 35, 37 and 39 over top panels 44 and 56 of inner container I (FIG. 3). Therefore, when outer container is sealed, the folded top panels of plastic liner 28 lie between top flaps 20, 22, 24, 26 and top panels 44 and 56, thereby securely closing the plastic liner 28 and creating additional cushion. In FIGS. 9 and 10, numeral 29 designates fold lines typically seen in this type of a liner. The fold lines 29 are due to the initial cylindrical shape of the liner which flattened and sealed at one end.

As best shown in FIGS. 2, 3, 5, and 6, the inner container I is preferably comprised of two adjacent insulated boxes 40 and 42. Insulated boxes 40 and 42 are each made of six insulated foam panels manufactured in accordance with Bane, U.S. Pat. Nos. 4,642,970 and 4,730,748, which are incorporated herein by reference. (While only two boxes have been shown to comprise the inner container I, it is well within the scope of this invention to vary this number as well the corresponding sizes thereof). In particular, box 40 comprises one top panel 44, one bottom panel 46, and four interconnected side panels 48, 50, 52, and 54 (FIG. 3). Likewise, box 42 comprises one top panel 56, one bottom panel 58, and four interconnected side panels 60, 62, 64, and 66.

As best shown in FIG. 4, side panel 52 is comprised of a front surface 68, a rear surface 70, first and second parallel flat edges 72 and 74, and two mitred edges 76 and 78. The side panels 48, 50, 54 and 60, 62, 64, and 66 are all similar in configuration to side panel 52. Mitred edge 76 is preferably disposed at an angle of about 45° to rear surface 70 and front surface 68. Mitred edge 78 is disposed at a second angle to surfaces 68 and 70 which is complementary to the angle of mitred edge 76. A thermoplastic envelop 80 tightly encases side panel 52, and an antiblister opening 82 is provided in the thermoplastic envelop 80 in order to prevent air or other gases from becoming trapped in the envelop 80. Seam 84 of the thermoplastic envelop 80 runs along the edges 74, 76 and 78 of side panel 52 substantially equidistant from the front and rear surfaces 68 and 70.

The assembly configuration of inner container 40 is best shown in FIGS. 3, 5 and 6. Bottom panel 46 is positioned in the bottom of liner 28 which is within outer container O, in a facial relation with the closed bottom 10. Side panels 48, 50, 52 and 54 are positioned vertically inside container O on bottom panel 46 and extend upwardly therefrom (FIG. 6). Side panels 48, 50, 52 and 54 are disposed in facial relation with sidewalls 12, 14, 16 and 18 such that the mitred edges of side panels 48, 50, 52 and 54 are in abutting relation to one another thus preventing the side panels 48, 50, 52 and 54 from shifting or otherwise changing orientation (FIG. 5). It is preferred that the seam 84 extend along the mitred edges so that the seams and the abutting mitred edges cooperate to lock the side panels 48, 50, 52 and 54 in position. This serves to increase the structural stability of the insulated box 40 when positioned in the shipping container O. The side panels 48, 50, 52 and 54 in cooperation with the bottom panel 46 define a space 94 which is to filled with the object(s) being shipped (FIG. 3). Top panel 44 is positioned in container C over side panels 48, 50, 52 and 54. The assembly of box 42 is similar in configuration to box 40.

As best shown in FIGS. 5 and 6 insulated boxes 40 and 42 are placed in outer container O in and adjacent position such that the rear surfaces of side panels 48 and 64 are in engagement with each other.

FIG. 7 shows the details of a side panel that comprises the inner insulated boxes 40 and 42. (Description is given with respect to panel 52. All panels 44, 46, 48, 50, 54, 60, 62, 64, and 66 are identical in construction). Panel 52 is made of a polyisocyanurate core 88 sandwiched between reflective layers 90 and 92. Preferably, reflective layers 90 and 92 are comprised of an aluminized coating which is bonded to the core 88. Preferably, the core 88 is foamed in situ between layers 90 and 92 for thereby providing excellent bonding therewith. Consequently, the sandwiched core 88 provides an insulating plate. FIG. 7 also discloses the thermoplastic envelop 80 which is outwardly disposed relative to layers 90 and 92. Therefore, each of the top panels 44 and 56, each of the bottom panels 46 and 58, and each of the side panels 48, 50, 52, 54, 60, 62, 64 and 66 provide an insulating plate.

Figure 8:
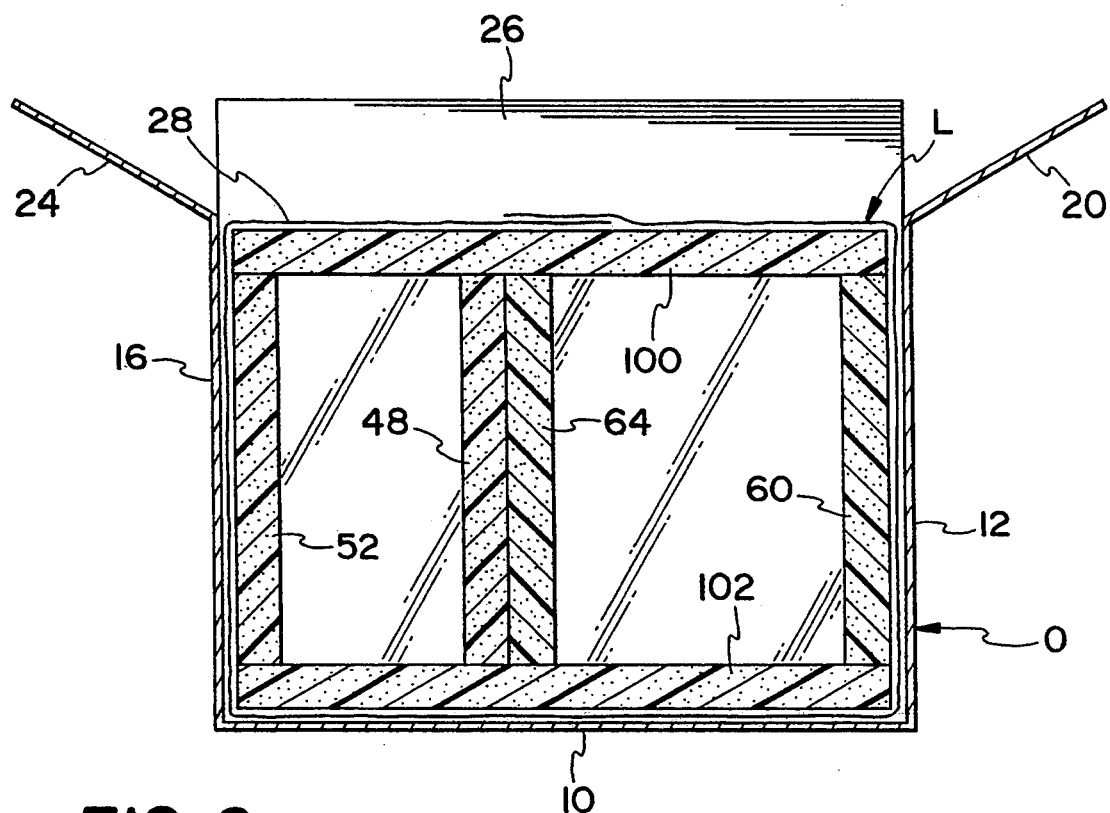
FIG. 8 is a second embodiment of the invention as similarly shown in FIG. 6.

The second embodiment shown in FIG. 8 is identical to the first embodiment shown in FIGS. 1–7, with the exception that boxes 40 and 42 have a common top panel 100 and a common bottom panel 102.

Figure 11:
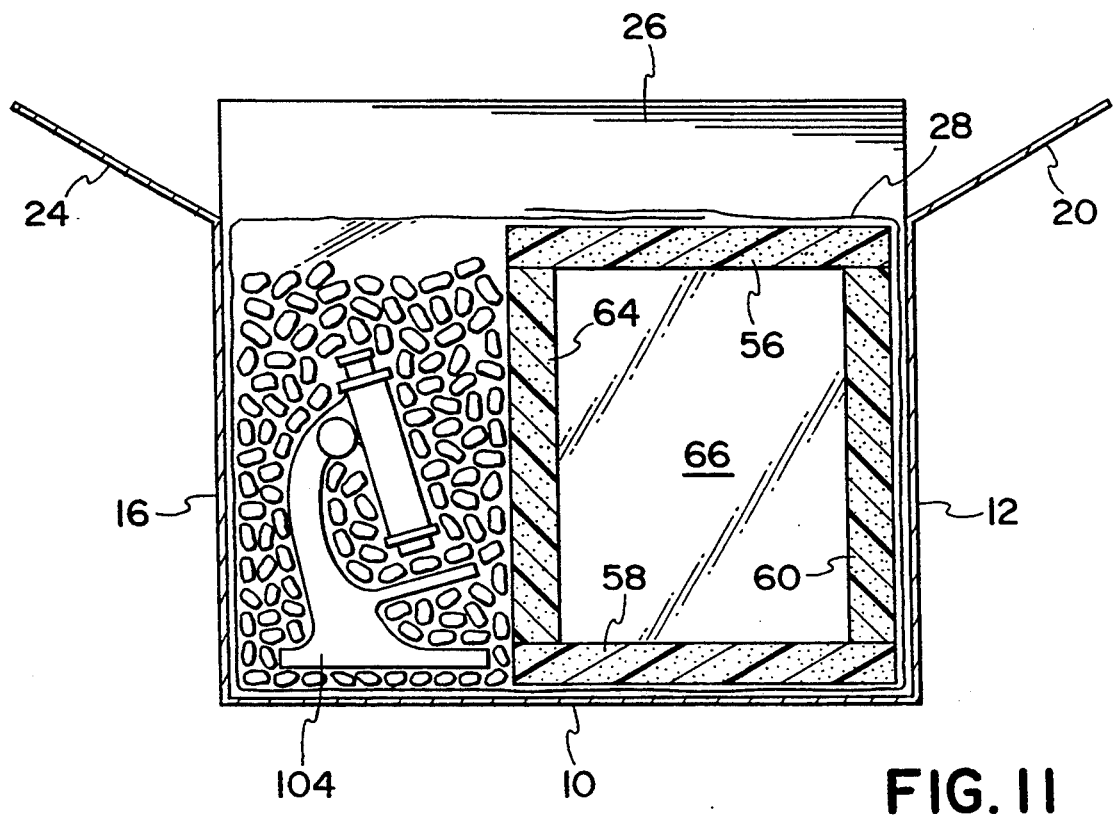
FIG. 11 is a third embodiment of the shipping container as similarly shown in FIG. 6.

A third embodiment of the invention is shown in FIG. 11. An advantage of this embodiment is that by using only one inner box within shipping container C, non-temperature sensitive material, such as a microscope 104, can be shipped with an kept separate from temperature sensitive materials.

As best shown in FIG. 1, cubes of ice, dry ice, or other suitable temperature control materials, are positioned in space 94 in order to maintain the required temperature of the material 98 being shipped. The insulated foam panels 44, 46, 48, 50, 52 and 54 are uniquely adapted for preventing heat from outside sources from being transferred into the spaced to be filled in insulated box 40. The shipping container is also uniquely designed to prevent the interior temperature of the insulated boxes 40 and 42 from affecting each other by the provision of a partition wall formed by insulated panels 48 and 64. This is accomplished by insulated panels 48 and 64 each having a minimum thickness of at least approximately ½ inch. It is within the scope of this invention to further vary the thicknesses of panels 48 and 64 to prevent the interior temperature of the insulated boxes 40 and 42 from affecting each other.

A particularly advantageous feature of the utilization of the thermoplastic envelop 80 is that the thermoplastic envelop 80 may be cleaned after use to thereby permitting the inner container I to be reused. Additionally, the insulated foam panels 44 and 46 may be individually interchanged in the event that one of them becomes damaged or otherwise becomes unsatisfactory. Also, the insulated foam panels may be shipped to an individual having need of the insulated boxes 40 and 42 without the outer container O. Consequently, the user of the insulated boxes 40 and 42 can order the insulated panels as needed and as required for the outer container O which is being utilized.

While this invention has been described as having a preferred design, it is understood that it is capable of further modifications, uses and/or adaptations of the invention following in general the principal of the invention and including such departures from the present disclosures as come within the known or customary practice in the art to which the invention pertains, and as may be applied to the central features hereinbefore set forth, and fall within the scope of the invention or the limits of the appended claims.

What I claim is:

1. A reusuable container for shipping temperature sensitive materials, comprising:
   a) an outer container having a center;
   b) a plurality of inner containers removably positioned in said outer container, each of said inner containers having a top and a bottom;
   c) said outer container having a plurality of interconnected side walls with a sealable top and a closed bottom;
   d) said inner containers each including a plurality of insulated side panels;
   e) said insulated side panels comprising a plurality of first members and a plurality of second members;
   f) each of said first members including generally planar first and second longitudinal surfaces;
   g) said first members positioned so that said first longitudinal surfaces thereof substantially engage one another;
   h) each of said first members having a thickness of at least approximately ½ inch; and
   i) said second members positioned adjacent respective said side walls of said outer container.

2. The container of claim 1, further comprising:
   a) spill containment means positioned between said outer container and said inner containers.

3. The container of claim 2, further comprising:
   a) a first and second insulated panels for respectively positioning adjacent said top and bottom of said inner containers.

4. The container of claim 2, wherein:
   a) said inner containers each includes insulated top and bottom panels.

5. The container of claim 1, wherein:
   a) said first members form a barrier wall disposed substantially along said center of said outer container.

6. The container of claim 1, wherein:
   a) each of said insulated side panels comprises first and second spaced parallel generally planar reflective layers and a rigid foamed insulating core member disposed between and bonded to each of said reflective layers;
   b) each of said reflective layers comprises an aluminized surface;
   c) each of said insulated side panels sheathed in a heat shrunk film of a heat shrinkable thermoplastic insulating film and said film having a portion contiguous with each of said reflective layers; and
   d) an anti-blister opening in each of said portions of said film on each of said insulated side panels and overlying each of said reflective layers for preventing blistering of said film by allowing air entrapped by each portion to vent during shrinking of said film.

7. The container of claim 6, wherein;
   a) each of said insulated side panels having four side edges and an opposite two of said side edges of each of said insulated side panels being mitred and the other two side edges being non-mitred;
   b) said mitred edges of each insulated side panel are in abutting relation with the mitred edges of the adjacent insulated side panel; and
   c) said insulating film being folded along one of said non-mitred side edges and having a continuous seam extending along the associated mitred edges and along the other non-mitred side edge of each insulated side panels so that said seams cooperate with said abutting mitred edges for locking said insulated side panels in position.

8. A reusable container for shipping temperature sensitive materials, comprising:
   a) an outer container having a center;
   b) a plurality of inner containers removably positioned in said outer container, each of said inner containers having a top and a bottom;
   c) said outer container having a plurality of interconnected side walls with a sealable top and a closed bottom;
   d) said inner containers each including a plurality of insulated side panels;
   e) said insulated side panels comprising a plurality of first members and a plurality of second members;
   f) each of said first members including generally planar first and second longitudinal surfaces;
   g) said first members positioned so that said first longitudinal surfaces thereof substantially engage one another;
   h) each of said first members having a thickness of at least approximately ½ inch;
   i) said second members positioned adjacent respective said side walls of said outer container;
   j) spill containment means positioned between said outer container and said inner containers;
   k) said spill containment means comprises a liner;
   l) said liner having a bottom, sides, and a top; and
   c) said liner having a length greater than the height of said outer container.

9. The container of claim 8, and including;
   a) first and second cushion means adjacent the top and bottom of said liner respectively.

10. The container of claim 9, wherein;
    a) said first cushion means is comprised of a plurality of inwardly folded top side portions of said liner.

11. The container of claim 9, wherein
    a) said liner bottom includes a generally flat central portion and left and right end portions.

12. The container of claim 11, wherein:
    a) said second cushion means is comprised of inwardly folded said left and right end portions.

13. The container of claim 12, wherein:
    a) a said bottom includes a seam running along said central portion and said left and right end portions.

14. A reusable container for shipping temperature sensitive materials, comprising:
    a) an outer container;

b) a plurality of inner containers removably positioned in said outer container, each of said inner containers having a top and a bottom;
c) said outer container having a plurality of interconnected side walls with a sealable top and a closed bottom;
d) said inner containers each including a plurality of insulated side panels;
e) said insulated side panels comprising a plurality of first members and a plurality of second members;
f) said first members including a pair;
g) each of said first members including generally planar first and second longitudinal surfaces;
h) said first members positioned so that said first longitudinal surfaces thereof substantially engage one another;
i) one of said pair having a thickness of at least ½ inch and the other of said pair having a thickness substantially greater than said one of said pair; and
j) said second members positioned adjacent respective said side walls of said outer container.

15. The container of claim 14, further comprising:
a) a spill containment means positioned between said outer container and said inner containers.

16. The container of claim 15, further comprising:
a) first and second insulated panels for respectively positioning adjacent said top and bottom of said inner containers.

17. The container of claim 15, wherein:
a) said inner containers each includes insulated top and bottom panels.

18. The container of claim 15, wherein:
a) said spill containment means comprises a liner;
b) said liner having a bottom, sides, and a top;
c) said bottom includes a generally flat central portion and left and right end portions; and
d) said liner having a length greater than the height of said outer container.

19. The container of claim 18, and including;
a) first and second cushion means adjacent the top and bottom of said liner respectively.

20. The container of claim 19, wherein;
a) said first cushion means is comprised of a plurality of inwardly folded top side portions of said liner; and
b) said second cushion means is comprised of inwardly folded said left and right end portions.

* * * * *